US012094482B2

(12) United States Patent
Zhang et al.

(10) Patent No.: US 12,094,482 B2
(45) Date of Patent: Sep. 17, 2024

(54) LEXICON LEARNING-BASED HELIUMSPEECH UNSCRAMBLING METHOD IN SATURATION DIVING

(71) Applicant: Nantong University, Nantong (CN)

(72) Inventors: Shibing Zhang, Nantong (CN); Jianrong Wu, Nantong (CN); Lili Guo, Nantong (CN); Ming Li, Nantong (CN); Zhihua Bao, Nantong (CN)

( * ) Notice: Subject to any disclaimer, the term of this patent is extended or adjusted under 35 U.S.C. 154(b) by 0 days.

(21) Appl. No.: 18/427,869

(22) Filed: Jan. 31, 2024

(65) Prior Publication Data

US 2024/0203436 A1 Jun. 20, 2024

Related U.S. Application Data

(63) Continuation of application No. PCT/CN2021/116054, filed on Sep. 1, 2021.

(30) Foreign Application Priority Data

Apr. 26, 2021 (CN) ......................... 202110450616.9

(51) Int. Cl.
*G10L 21/00* (2013.01)
*G10L 15/06* (2013.01)
(Continued)

(52) U.S. Cl.
CPC ........ *G10L 21/0208* (2013.01); *G10L 15/063* (2013.01); *G10L 15/16* (2013.01); *G10L 25/51* (2013.01); *G10L 2015/0633* (2013.01)

(58) Field of Classification Search
CPC ... G10L 21/00; G10L 21/003; G10L 21/0364; G10L 21/0208; G10L 15/063;
(Continued)

(56) References Cited

U.S. PATENT DOCUMENTS 3,562,451 A * 2/1971 Mullen, Jr. ............. H04M 1/05 367/160
3,584,158 A * 6/1971 Jefferies .................... G11B 5/00 360/8

(Continued)

FOREIGN PATENT DOCUMENTS

CN 111976924 A 11/2020
GB 1187536 A 4/1970

(Continued)

OTHER PUBLICATIONS

Internation Search Report of PCT/CN2021/116054, Mailed Jan. 27, 2022.

(Continued)

*Primary Examiner* — Jakieda R Jackson

(57) ABSTRACT

The present application relates to a lexicon learning-based heliumspeech unscrambling method in saturation diving. In a system including divers, a correction network, and an unscrambling network, a common working language lexicon for saturation diving operation is established and is read by the divers respectively in different environments, to generate supervision signals and vector signals of the correction network, and the correction network learns heliumspeeches of the different divers at different diving depths to obtain a correction network parameter, and corrects a heliumspeech of a diver to obtain a corrected speech; and the unscrambling network learns the corrected speech and completes unscrambling of the heliumspeech.

10 Claims, 1 Drawing Sheet

(51) Int. Cl.
*G10L 15/16* (2006.01)
*G10L 21/0208* (2013.01)
*G10L 25/51* (2013.01)

(58) Field of Classification Search
CPC . G10L 15/16; G10L 25/51; G10L 2015/0633; G10L 2021/03643; B36C 11/26; H04B 11/00; H04B 1/662; Y10S 367/91
See application file for complete search history.

(56) References Cited

U.S. PATENT DOCUMENTS

| | | | | | |
|---|---|---|---|---|---|
| 3,621,150 | A * | 11/1971 | Pappas et al. | G10L 21/00 704/211 |
| 3,632,877 | A * | 1/1972 | Gray | G10L 21/00 381/54 |
| 3,634,625 | A * | 1/1972 | Geohegan, Jr. | G10L 21/00 381/54 |
| 3,681,756 | A * | 8/1972 | Burkhard | G10L 21/00 704/211 |
| 3,736,551 | A * | 5/1973 | Hirsch | B63C 11/26 340/407.1 |
| 3,813,687 | A | 5/1974 | Geil | |
| 3,815,591 | A * | 6/1974 | Schreiner | B63C 11/18 514/789 |
| 3,825,685 | A * | 7/1974 | Roworth | G10L 19/02 381/54 |
| 3,863,026 | A | 1/1975 | Dildy, Jr. | |
| 3,909,529 | A * | 9/1975 | Morrow | H04R 1/44 381/189 |
| 3,924,069 | A * | 12/1975 | Dildy, Jr. | G10L 21/00 381/54 |
| 3,950,617 | A * | 4/1976 | Dildy, Jr. | G10L 21/00 381/54 |
| 3,965,298 | A | 6/1976 | Carlson | |
| 3,995,116 | A * | 11/1976 | Flanagan | G10L 19/02 704/265 |
| 4,079,197 | A | 3/1978 | Zurcher | |
| 4,342,104 | A * | 7/1982 | Jack | G10L 21/00 381/54 |
| 4,382,160 | A * | 5/1983 | Gosling | G10L 25/00 704/214 |
| 7,310,286 | B1 * | 12/2007 | Jarvis | H04B 11/00 367/134 |
| 2014/0180686 | A1 * | 6/2014 | Schuck | G10L 15/26 704/235 |
| 2016/0036402 | A1 | 2/2016 | Bongiovi et al. | |
| 2016/0350653 | A1 * | 12/2016 | Socher | G06N 5/04 |
| 2017/0140745 | A1 * | 5/2017 | Nayak | H04L 65/1089 |
| 2019/0139218 | A1 * | 5/2019 | Song | G06N 3/044 |
| 2022/0319534 | A1 * | 10/2022 | Krishnan Gorumkonda | G06N 3/045 |

FOREIGN PATENT DOCUMENTS

| | | | |
|---|---|---|---|
| JP | H036964 | A | 1/1991 |
| JP | H11327598 | A | 11/1999 |
| JP | 2010134260 | A | 6/2010 |
| JP | 2012173631 | A | 9/2012 |
| WO | 2012158046 | A2 | 11/2012 |

OTHER PUBLICATIONS

Wang, Xia et al., "Mask Speech Recognition based on Convolutional Neural Network", Transducer and Microsystem Technologies, vol. 36, No. 10, Oct. 31, 2017 (Oct. 31, 2017), parts 1, 2.1 and 3.

Li, Dongmei et al., "Helium Speech Correction Algorithm Based on Deep Neural Networks", The 12th International Conference on Wireless Communications and Signal Processing, Oct. 23, 2020, section III.

Zhang, Shibing et al., "A Survey on Heliumspeech Communications in Saturation Diving", China Communications,Jun. 30, 2020, entire document.

* cited by examiner

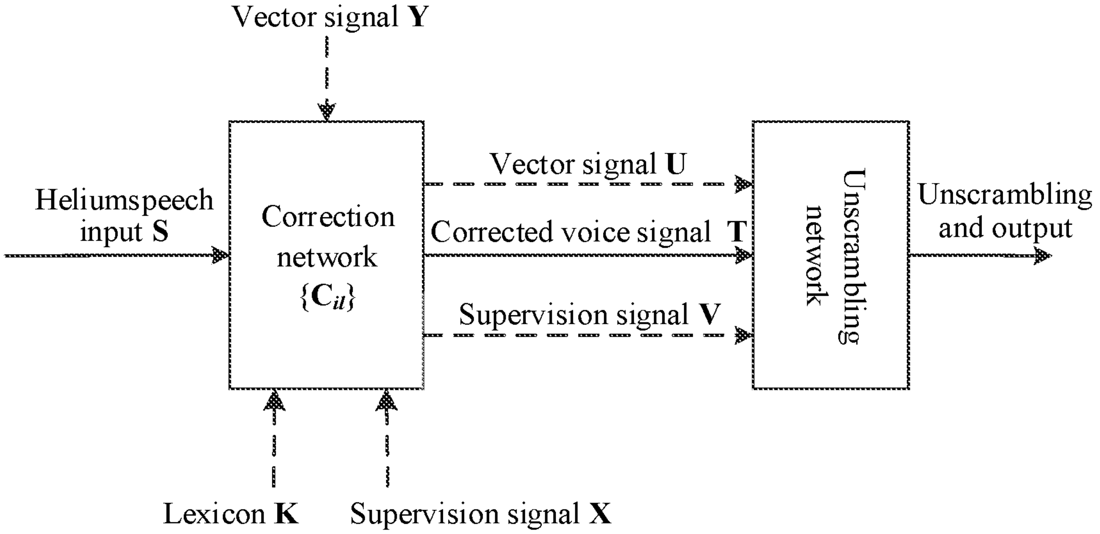
Vector signal Y
Heliumspeech input S
Correction network {C_il}
Vector signal U
Corrected voice signal T
Supervision signal V
Unscrambling network
Unscrambling and output
Lexicon K
Supervision signal X

LEXICON LEARNING-BASED HELIUMSPEECH UNSCRAMBLING METHOD IN SATURATION DIVING

CROSS-REFERENCE TO RELATED APPLICATIONS

This application claims priority to Chinese Patent Application No. 202110450616.9, titled "Lexicon Learning-based Heliumspeech Unscrambling Method in Saturation Diving", filed Apr. 26, 2021, the entire disclosure of which is incorporated herein by reference.

TECHNICAL FIELD

The present application relates to heliumspeech unscrambling technologies, and more specifically, to a lexicon learning-based heliumspeech unscrambling method in saturation diving.

BACKGROUND

The $21^{st}$ century is the era of marine economy. More than 50% of clean energy and means of production needed by mankind will be obtained from the ocean. Saturation diving has an important application value in the fields such as nautical operation, marine development, military oceanography, and maritime rescue, and is an indispensable part of marine economic development.

Due to the particularity of the environment and content of deep-sea operation, many tasks in the ocean still cannot be completed by manned deep-sea submersibles or underwater robots. Therefore, divers need to be directly launched into the water and carry out operation in deep-sea high-pressure environments by applying the saturation diving technology. To meet physiological needs of divers in deep-sea high-pressure environments, currently, the divers basically use a helium-oxygen mixture as their breathing gas during saturation diving operation. When the diving operation depth exceeds 50 m, voice communication of the divers is obviously distorted. When the diving operation depth exceeds 100 m, voice communication of the divers begins to be seriously distorted, and a normal speech becomes a strange "Donald Duck speech", that is, a heliumspeech, which makes it difficult to understand the voice communication of the divers, resulting in difficulty in communication between the inside and the outside of a submersible and between the divers, which directly affects deep-sea operation of the divers and even threatens the lives of the divers. Therefore, it is urgently needed to resolve the voice communication problem of divers in deep-sea saturation diving, that is, the heliumspeech unscrambling problem.

At present, existing heliumspeech unscramblers for saturation diving in China and abroad all unscramble heliumspeeches through heliumspeech unscramblers in submersibles by manually adjusting frequency domains or time domains of the unscramblers, and cannot adapt to the change of the depth of saturation diving operation, resulting in poor unscrambling effects. When a diving depth is greater than 200 m, unscrambling quality of the heliumspeech unscramblers rapidly drops. Particularly, when a diving depth of a diver is changing, a heliumspeech of the diver cannot be effectively unscrambled. Artificial intelligence-based heliumspeech unscrambling technologies in saturation diving are just started in China and abroad, and there are few practical technical solutions. How to effectively unscramble a heliumspeech by fully using a machine learning capability of artificial intelligence with reference to the particularity of divers and a working language in a saturation diving scenario is an unresolved technical problem.

SUMMARY

An objective of the present application is to resolve the foregoing problems. In consideration of a saturation diving scenario, divers are specific people, and during diving operation, a working language of the divers is limited. The present application provides a lexicon learning-based heliumspeech unscrambling method by fully utilizing individual speech signal characteristics of divers and word information of a working language lexicon. In this method, first, a common working language lexicon of divers is established according to saturation diving specifications, the divers read the working language lexicon aloud respectively in a normal atmospheric environment and environments corresponding to saturation diving operation, to generate supervision signals and vector signals of the correction network for machine learning, and the correction network learns heliumspeeches of the different divers at different diving depths by using a supervised learning algorithm, to obtain a correction network parameter set; second, during diving operation, the divers fit their heliumspeech signals with the vector signals of the correction network, select a network parameter corresponding to a vector signal having the highest fitness as a correction network parameter, and correct a heliumspeech of a diver to obtain a corrected speech signal; then, the corrected speech signal is fitted with the common working language lexicon, and is filtered according to the fitnesses, to generate supervision signals and vector signals of the unscrambling network for machine learning, and the unscrambling network further learns the corrected speech signal by using the supervised learning algorithm; and finally, the unscrambling network unscrambles the corrected speech signal, to complete perfect unscrambling of the heliumspeech. In this method, individual speech signal characteristics of the divers in different environments and word information of the working language lexicon are fully used, and a heliumspeech is corrected and unscrambled by using a machine learning algorithm, to greatly improve accuracy of heliumspeech unscrambling.

The foregoing objective is achieved through the following technical solution: The present application provides a lexicon learning-based heliumspeech unscrambling method in saturation diving, applicable to a system including at least one diver, one heliumspeech correction network, and one heliumspeech unscrambling network, where a heliumspeech signal of the diver is S, and the heliumspeech unscrambling method includes the following steps:

First Stage—Learning of the Correction Network step 1. lexicon signal construction—constructing a common working language lexicon K of the diver for saturation diving operation according to saturation diving specifications;

step 2. supervision signal generation—reading, by the diver i, words in the lexicon K in a normal atmospheric environment to obtain supervision signals $X_i$, to generate a supervision signal set $X=\{X_i\}$ of the correction network for machine learning, wherein i=1, 2, . . . , I, and I is a number of divers;

step 3. vector signal generation—reading, by the diver i, the words in the lexicon K respectively in environments corresponding to saturation diving depths $h_1$, $h_2$, $h_3$, . . . , $h_L$, to obtain vector signals $Y_{i, 1}$, wherein l=1, 2, . . . , L, and L is a number of heliumspeech test points, to generate a vector signal set $Y=\{Y_{i,1}\}$ of the correction network for machine learning;

step 4. learning of the correction network—performing, by the correction network, supervised learning by using the vector signals $Y_{i,1}$ as input signals and the supervision signals $X_i$ as expected output signals to form a correction network parameter set $C=\{C_{i,1}\}$ corresponding to the vector signals $Y_{i,1}$;

Second Stage—Heliumspeech Unscrambling step 5. correction network parameter selection—fitting the working speech S (heliumspeech) of the diver during saturation diving operation with all the vector signals $Y_{i,1}$ in the vector signal set Y, and selecting a parameter $C_{n,1}$ corresponding to a vector signal $Y_{n,1}$ having the highest fitness as a correction network parameter;

step 6. heliumspeech correction—correcting the heliumspeech signal S by using the heliumspeech signal S as of an input signal of the correction network (in this case, the network parameter of the correction network is $C_{n,1}$), to generate a corrected speech signal T;

step 7. learning of the unscrambling network—comparing speeches in the corrected speech signal T with speeches in the supervision signals in the supervision signal set X of the correction network for machine learning word by word, to calculate fitnesses therebetween;

selecting, from the supervision signal set X, speeches corresponding to words having the highest fitnesses; matching the selected speeches with speeches corresponding to the words in the corrected speech signal T into groups;

sorting, in descending order by fitness, the matched speeches of the groups;

selecting the top p % of the groups in orders of the fitness;

taking speeches in the corrected speech signal T in the selected top p % of the groups as a vector signal U of the unscrambling network for machine learning and taking speeches corresponding to words in the supervision signal set X in the selected top p % of the groups as a supervision signal V of the unscrambling network for machine learning;

performing, by the unscrambling network, supervised learning; and step 8. heliumspeech unscrambling—unscrambling of the heliumspeech S is completed by using the corrected speech signal T as an input signal of the unscrambling network.

The present application further has the following features:

1. In step 1, the constructed common working language lexicon K of divers for saturation diving operation is set according to saturation diving specifications of a unit using a heliumspeech unscrambler. For different units using the heliumspeech unscrambler, the common working language lexicons K are different.
2. In step 2, each diver has a supervision signal, and because different divers have different pronunciations, their supervision signals are also different.
3. In step 3, the heliumspeech test point depths $h_1$, $h_2$, $h_3$, . . . , $h_L$ need to evenly cover a preset depth of salvaging and diving operation, but may alternatively unevenly cover the preset depth of salvaging and diving operation.
4. In step 3, a number of the test points depends on the preset depth of salvaging and diving operation and a spacing between test points, where a shorter spacing between test points makes unscrambling of a heliumspeech more perfect, but results in a longer time for generating vector signals and higher complexity of heliumspeech unscrambling.
5. In step 4, the adopted learning algorithm may be a supervised learning algorithm in any form or a semi-supervised learning algorithm in any form.
7. In step 4, a structure of the correction network corresponds to the learning algorithm selected in step 4.
8. In step 5, the adopted fitness evaluation indicator is a Euclidean distance between the heliumspeech S and the vector signal $Y_{i,1}$, or may be another evaluation indicator such as a mean or a variance.
9. In step 7, the adopted fitness evaluation indicator is a Euclidean distance between the corrected speech signal T and the word in the lexicon K, or may be another evaluation indicator such as a mean or a variance.
10. In step 7, a word filtering proportion p is related to a specified size of the lexicon K, where the larger the lexicon K, the larger the probability that communication words of divers during operation fall within the lexicon K, and the larger the value of p, the more perfect the heliumspeech unscrambling. Usually, if a number of words in the lexicon K is between 100 and 300, a value of p is selected from between 85 and 98.
11. In step 7, the adopted learning algorithm may be a supervised learning algorithm in any form, for example, a K-nearest neighbor algorithm or a decision tree algorithm, or a semi-supervised learning algorithm in any form, for example, a self-training algorithm or a semi-supervised support vector machine algorithm.
12. In step 7, a structure of the correction network corresponds to the learning algorithm selected in step 7.
13. In step 6, a speech of the diver is not seriously distorted, the corrected speech signal T can be directly output as an unscrambled heliumspeech signal.
14. In step 1 to step 8, step 1 to step 4 are performed by divers in the submersible (during preliminary preparation for diving operation), and step 5 to step 8 are performed by the diver during deep-sea diving operation.
15. In step 2, a word label may be used as a supervision signal of the correction network, and in this case, the divers do not need to read words in the lexicon K aloud, and the lexicon K is directly used as the supervision signal X; and correspondingly, the corrected speech signal T generated in step 6 is also word, and an unscrambled heliumspeech signal generated in step 8 is also word.

The method of the present application is utilizing, in heliumspeech unscrambling, individual speech signal characteristics of divers in different environments and word information of a working language lexicon, as well as a machine learning capability of an artificial intelligence network, so as to produce the following beneficial effects:

(1) A number of samples required by a network for machine learning is reduced by learning word information of a working language lexicon of divers, so that the divers can complete learning of the correction network during a preliminary preparation stage of the submersible for diving operation.

(2) Individual speech signal characteristics of the divers in different environments are learned, to improve learning efficiency of a machine learning network, eliminate influence of ambient noise on heliumspeech unscrambling, and make a heliumspeech unscrambler adaptable during unscrambling of heliumspeeches at different diving depths.

(3) The correction network is combined with the unscrambling network, to improve accuracy of heliumspeech unscrambling.

BRIEF DESCRIPTION OF THE DRAWINGS

FIG. 1 is a flowchart of heliumspeech unscrambling.

DETAILED DESCRIPTION OF THE EMBODIMENTS

The present application is further described below with reference to the accompanying drawings and specific embodiments.

In a system including a diver, a heliumspeech correction network, and a heliumspeech unscrambling network, first, a common working language lexicon of divers is established according to saturation diving specifications, the divers read the working language lexicon aloud respectively in a normal atmospheric environment and environments corresponding to saturation diving operation, to generate supervision signals and vector signals of the correction network for machine learning, and the correction network learns heliumspeeches of the different divers at different diving depths by using a supervised learning algorithm, to obtain a correction network parameter set; second, during diving operation, the divers fit their heliumspeech signals with the vector signals of the correction network, select a network parameter corresponding to a vector signal having the highest fitness as a correction network parameter, and correct a heliumspeech of a diver to obtain a corrected speech signal; then, the corrected speech signal is fitted with the common working language lexicon, and is filtered in descending order by fitness, to generate supervision signals and vector signals of the unscrambling network for machine learning, and the unscrambling network further learns the corrected speech signal by using the supervised learning algorithm; and finally, the unscrambling network unscrambles the corrected speech signal, to complete perfect unscrambling of the heliumspeech.

First Stage—Correction Network Learning

Step 1. Lexicon signal construction: Construct a common working language lexicon K of the diver for saturation diving operation according to saturation diving specifications.

In this embodiment, according to saturation diving specifications of the XX Salvage Bureau, a common working language lexicon K including 150 words such as "diving, deck, temperature, and pressure".

Step 2. Supervision signal generation: the diver i reads words in the lexicon K aloud in a normal atmospheric environment to obtain supervision signals $X_i$, so as to generate a supervision signal set $X=\{X_i\}$ of the correction network for machine learning, where i=1, 2, . . . , I, and I is a number of the divers.

In this embodiment, two divers respectively read words in the lexicon K aloud, to generate a supervision signal set, $X_1$ (speech signal) and $X_2$ (speech signal), of the correction network for machine learning.

Step 3. Vector signal generation: The diver i reads the words in the lexicon K aloud respectively in environments corresponding to saturation diving depths $h_1$, $h_2$, $h_3$, . . . , $h_L$ to obtain vector signals $Y_{i,1}$, where l=1, 2, . . . , L, and L is a number of the heliumspeech test points, so as to generate a vector signal set $Y=\{Y_{i,1}\}$ of the correction network for machine learning.

In this embodiment, a saturation diving depth ranges from 200 m to 250 m, a spacing between test points is 10 m, and the two divers respectively read the words in the lexicon K in the submersible in environments corresponding to saturation diving depths of 200 m, 210 m, 220 m, 230 m, 240 m, and 250 m, to generate vector signals (speech signal) $Y_{1,1}$, $Y_{1,2}$, $Y_{1,3}$, $Y_{1,4}$, $Y_{1,5}$, $Y_{1,6}$, $Y_{2,1}$, $Y_{2,2}$, $Y_{2,3}$, $Y_{2,4}$, $Y_{2,5}$, and $Y_{2,6}$ of the correction network for machine learning.

Step 4. Learning of the correction network: The correction network performs supervised learning by using the vector signals $Y_{i,1}$ as input signals and the supervision signals $X_i$ as expected output signals to form a correction network parameter set $C=\{C_{i,1}\}$ corresponding to the vector signals $Y_{i,1}$.

In this embodiment, the correction network performs supervised learning by using a K-nearest neighbor algorithm. After the supervised learning, the correction network generates corresponding correction network parameters $C_{1,1}$, $C_{1,2}$, $C_{1,3}$, $C_{1,4}$, $C_{1,5}$, $C_{1,6}$, $C_{2,1}$, $C_{2,2}$, $C_{2,3}$, $C_{2,4}$, $C_{2,5}$, and $C_{2,6}$ in correspondence to the different vector signals $Y_{1,1}$, $Y_{1,2}$, $Y_{1,3}$, $Y_{1,4}$, $Y_{1,5}$, $Y_{1,6}$, $Y_{2,1}$, $Y_{2,2}$, $Y_{3,3}$, $Y_{4,4}$, $Y_{5,5}$, and $Y_{6,6}$ and the supervision signals $X_1$ and $X_2$. When input vector signals of the correction network are $Y_{1,1}$, $Y_{1,2}$, $Y_{1,3}$, $Y_{1,4}$, $Y_{1,5}$, and $Y_{1,6}$, their supervision signal is $X_1$. When input vector signals of the correction network are $Y_{2,1}$, $Y_{2,2}$, $Y_{2,3}$, $Y_{2,4}$, $Y_{2,5}$, and $Y_{2,6}$, their supervision signal is $X_2$.

Second Stage—Heliumspeech Unscrambling

Step 5. Correction network parameter selection: Fit the working speech S (heliumspeech) of the diver during normal saturation diving operation with all the vector signals $Y_{i,1}$ in the vector signal set Y, and select a parameter $C_{n,1}$ corresponding to a vector signal $Y_{n,1}$ having the highest fitness as a network parameter of the correction network.

In this embodiment, when the diver 1 is working, a working speech signal of the diver 1, that is, the heliumspeech S, is fitted with all the vector signals $Y_{1,1}$, $Y_{1,2}$, $Y_{1,3}$, $Y_{1,4}$, $Y_{1,5}$, $Y_{1,6}$, $Y_{2,1}$, $Y_{2,2}$, $Y_{2,3}$, $Y_{2,4}$, $Y_{2,5}$, and $Y_{2,6}$ respectively, and the network parameter $C_{1,3}$ corresponding to the vector signal $Y_{1,3}$ having the highest fitness, is selected as the network parameter of the correction network. During the fitting, the Euclidean distance is used as an evaluation indicator.

Step 6. Heliumspeech correction: Correct the heliumspeech signal S by using the heliumspeech signal S of an input signal of the correction network (in this case, the network parameter of the correction network is $C_{n,1}$), to generate a corrected speech signal T.

In this embodiment, the correction network parameter adopted by the correction network for correcting the heliumspeech signal S is $C_{1,3}$, and the generated corrected speech signal is T.

Step 7. Learning of the unscrambling network: compare speeches in the corrected speech signal T with speeches in the supervision signals in the supervision signal set X of the correction network for machine learning word by word, to calculate fitnesses therebetween; select, from the supervision signal set X, speeches corresponding to words having the highest fitnesses; matching the selected speeches with speeches corresponding to the words in the corrected speech signal T into groups; sort, in descending order by fitness, the matched speeches of the groups; selecting the top p % of the groups in orders of the fitness; take speeches in the corrected speech signal T in the selected top p % of the groups as a vector signal U of the unscrambling network for machine learning and taking speeches corresponding to words in the supervision signal set X in the selected top p % of the groups as a supervision signal V of the unscrambling network for machine learning. The unscrambling network performs supervised learning.

In this embodiment, the corrected speech signal T is compared with the supervision signals in the supervision signal set X of the correction network for machine learning word by word by using the Euclidean distance, speeches corresponding to words having the highest fitnesses with speeches corresponding to the words in the corrected speech signal T are selected from the supervision signal set X, the speeches are matched into groups, the speeches that are matched into groups are sorted in descending order by fitness, speech signals in the corrected speech signal T in the top 90% of matched groups in terms of the fitness are selected as a vector signal U of the unscrambling network for machine learning, and speech signals in the supervision signal set X corresponding thereto are used as supervision signals V of the unscrambling network for machine learning. The unscrambling network performs supervised learning. The unscrambling network performs supervised learning by using the K-nearest neighbor algorithm.

Step 8. Heliumspeech unscrambling: Unscramble the heliumspeech S by using the corrected speech signal T as an input signal of the unscrambling network.

In addition to the foregoing embodiments, the present application may further include other implementations. Any technical solution formed through equivalent replacement or equivalent transformation falls within the protection scope claimed in the present application.

The invention claimed is:

1. A lexicon learning-based heliumspeech unscrambling method in saturation diving, applicable to a system comprising at least one diver i, one heliumspeech correction network, and one heliumspeech unscrambling network, wherein a heliumspeech signal of the diver i is S, and the heliumspeech unscrambling method comprises the following steps:

step 1. lexicon signal construction-constructing a common working language lexicon K of the diver i for saturation diving operation according to saturation diving specifications;

step 2. supervision signal generation-reading, by the diver i, words in the lexicon K in a normal atmospheric environment to obtain supervision signals $X_i$, to generate a supervision signal set $X=\{X_i\}$ of the heliumspeech correction network for machine learning, wherein i=1, 2, . . . , I, and I is a number of divers;

step 3. vector signal generation-reading, by the diver i, the words in the lexicon K respectively in environments corresponding to saturation diving depths $h_1$, $h_2$, $h_3$, . . . , $h_L$, to obtain vector signals $Y_{i,l}$, wherein l=1, 2, . . . , L, and L is a number of heliumspeech test points, to generate a vector signal set $Y=\{Y_{i,l}\}$ of the heliumspeech correction network for machine learning;

step 4. learning of the heliumspeech correction network-performing, by the heliumspeech correction network, supervised learning by using the vector signals $Y_{i,l}$ as input signals and the supervision signals $X_i$ as expected output signals to form a correction network parameter set $C=\{C_{i,l}\}$ corresponding to the vector signals $Y_{i,l}$;

step 5. correction network parameter selection-fitting the heliumspeech signal S of the diver i during saturation diving operation with all the vector signals $Y_{i,l}$ in the vector signal set Y, and selecting a parameter $C_{n,l}$ corresponding to a vector signal $Y_{n,l}$ having a highest fitness as a correction network parameter;

step 6. heliumspeech correction-correcting the heliumspeech signal S by using the heliumspeech signal S as an input signal of the heliumspeech correction network, to generate a corrected speech signal T;

step 7. learning of the unscrambling network-comparing speeches in the corrected speech signal T with speeches in the supervision signals in the supervision signal set X of the heliumspeech correction network for machine learning word by word, to calculate fitnesses therebetween;

selecting, from the supervision signal set X, speeches corresponding to words having the highest fitnesses; matching the selected speeches with speeches corresponding to the words in the corrected speech signal T into groups;

sorting, in descending order by fitness, the matched speeches of the groups;

selecting a top p % of the groups in orders of the fitness;

taking speeches in the corrected speech signal T in the selected top p % of the groups as a vector signal U of the unscrambling network for machine learning and taking speeches corresponding to words in the supervision signal set X in the selected top p % of the groups as a supervision signal V of the heliumspeech unscrambling network for machine learning, and performing, by the unscrambling network, supervised learning; and step 8. heliumspeech unscrambling-unscrambling the heliumspeech signal S by using the corrected speech signal T as an input signal of the heliumspeech unscrambling network.

2. The lexicon learning-based heliumspeech unscrambling method in saturation diving according to claim 1, wherein in step 5 and step 7, an evaluation indicator of the fitness is a Euclidean distance or a variance, a smaller Euclidean distance indicates a higher fitness, and a smaller variance indicates a higher fitness.

3. The lexicon learning-based heliumspeech unscrambling method in saturation diving according to claim 1, wherein the common working language lexicon K of the diver i for saturation diving operation is set by using a heliumspeech unscrambler according to saturation diving specifications of a unit.

4. The lexicon learning-based heliumspeech unscrambling method in saturation diving according to claim 1, wherein heliumspeech test point depths $h_1$, $h_2$, $h_3$, . . . , $h_t$ evenly cover a preset depth of salvaging and diving operation.

5. The lexicon learning-based heliumspeech unscrambling method in saturation diving according to claim 4, wherein a number of test points is determined according to the preset depth of salvaging and diving operation and a spacing between the test points.

6. The lexicon learning-based heliumspeech unscrambling method in saturation diving according to claim 1, wherein in step 2, when a supervision signal of the correction network is a word label, the lexicon K is directly used as the supervision signal X; and correspondingly, the corrected speech signal T generated in step 6 is also word, and an unscrambled heliumspeech signal generated in step 8 is word.

7. The lexicon learning-based heliumspeech unscrambling method in saturation diving according to claim 1, wherein if a number of words in the lexicon K is between 100 and 300, a value of p is selected from between 85 and 98.

8. The lexicon learning-based heliumspeech unscrambling method in saturation diving according to claim 1, wherein the learning methods used in step 4 and step 7 are a K-nearest neighbor algorithm and a decision tree algorithm, or a self-training algorithm and a semi-supervised support vector machine algorithm.

9. The lexicon learning-based heliumspeech unscrambling method in saturation diving according to claim 1, wherein a distortion recognition is performed on the speech of the diver i, and if a distortion is relatively low, the corrected speech signal T is directly output as an unscrambled heliumspeech signal.

10. The lexicon learning-based heliumspeech unscrambling method in saturation diving according to claim 1, wherein step 1 to step 4 are performed by the diver i in a submersible, and step 5 to step 8 are performed by the diver i during deep-sea diving operation.

* * * * *